US008619030B2

(12) United States Patent
Plestid

(10) Patent No.: US 8,619,030 B2
(45) Date of Patent: Dec. 31, 2013

(54) METHOD AND APPARATUS FOR CONTROLLING AN OUTPUT DEVICE OF A PORTABLE ELECTRONIC DEVICE

(75) Inventor: Thomas Leonard Trevor Plestid, Ottawa (CA)

(73) Assignee: BlackBerry Limited, Waterloo (CA)

( * ) Notice: Subject to any disclaimer, the term of this patent is extended or adjusted under 35 U.S.C. 154(b) by 121 days.

(21) Appl. No.: 12/942,562

(22) Filed: Nov. 9, 2010

(65) Prior Publication Data

US 2012/0113002 A1 May 10, 2012

(51) Int. Cl.
*G06F 3/033* (2013.01)

(52) U.S. Cl.
USPC ............................................. 345/158; 463/7

(58) Field of Classification Search
USPC ............................................. 345/158; 463/7
See application file for complete search history.

(56) References Cited

U.S. PATENT DOCUMENTS

| | | | |
|---|---|---|---|
| 6,597,443 B2 | 7/2003 | Boman | |
| 6,890,262 B2 * | 5/2005 | Oishi et al. | 463/31 |
| 6,937,272 B1 | 8/2005 | Dance | |
| 6,993,195 B2 * | 1/2006 | Olivieri | 382/232 |
| 7,184,020 B2 * | 2/2007 | Matsui | 345/156 |
| 2003/0053709 A1 | 3/2003 | Olivieri | |
| 2007/0091037 A1 | 4/2007 | Lee | |
| 2007/0268246 A1 * | 11/2007 | Hyatt | 345/156 |
| 2009/0197615 A1 * | 8/2009 | Kim et al. | 455/456.1 |
| 2010/0053324 A1 * | 3/2010 | Kim et al. | 348/142 |
| 2010/0064259 A1 * | 3/2010 | Alexanderovitc et al. | 715/852 |
| 2012/0004034 A1 * | 1/2012 | Pope et al. | 463/36 |

OTHER PUBLICATIONS

GDC08: Boom Blox to Include Head Tracking: downloaded from http://www.joystiq.com/2008/02/21/gdc08-boom-blox-to-include-head-tracking-seriously/.
iPhone to Become 3D Virtual Reality Goggles: downloaded from http://www.techradar.com/news/phone-and-communications/mobile-phones/iphone-to-become-3d-virtual-reality-goggles-267436.
Eye-Tracking Alternative to the Mouse; downloaded from: http://www.wired.com/gadgetlab/2007/03/eyetracking_alt/.
System and Methods on Utilizing Head Tracking on Mobile Devices, IBM, Jul. 25, 2008.
European Patent Application No. 10 19 0447.2 Search report mailed Feb. 2, 2011.
Head Tracking for Desktop VR Displays using the WiiRemote. Downloaded from the Internet on Mar. 25, 2011. http://www.youtube.com/watch?v=Jd3-eiid-Uw (CD attached).
Canadian Patent Application No. 2757971 Examination Report dated Jul. 19, 2013.

* cited by examiner

*Primary Examiner* — Amr Awad
*Assistant Examiner* — Damon Treitler
(74) *Attorney, Agent, or Firm* — Perry + Currier Inc.; Kristjan Spence

(57) ABSTRACT

A method and apparatus are provided for controlling an output device, such as a display, of a portable electronic device. The portable electronic device includes a processor, first and second motion sensors, and the output device. The method includes receiving from the first motion sensor, first motion data representing movement of an external object relative to the portable electronic device. The method also includes receiving, from the second motion sensor, second motion data representing movement of the portable electronic device. Third motion is generated data based on the first and second motion data. The third motion data represents movement of the external object. The output device is then controlled based on the third motion data.

13 Claims, 7 Drawing Sheets

METHOD AND APPARATUS FOR CONTROLLING AN OUTPUT DEVICE OF A PORTABLE ELECTRONIC DEVICE

FIELD

The specification relates generally to portable electronic devices, and specifically to a method, system and apparatus for controlling an output device of a portable electronic device.

BACKGROUND

As portable electronic devices and other computing devices become more powerful, the functionality provided by such devices continues to expand and improve. In particular, continued increases in computational power allow such devices to carry out a wider range of interactions with their users and environments. In particular, motion capture and motion tracking technologies have previously been used, for example, in cinematography, but can require significant computing resources. The increasing capabilities of portable electronic devices allow such devices to carry out interactions based on similar technologies.

BRIEF DESCRIPTIONS OF THE DRAWINGS

Embodiments are described with reference to the following figures, in which.

DETAILED DESCRIPTION OF THE EMBODIMENTS

An aspect of the specification provides a method of controlling an output device of a portable electronic device comprising a processor, a first motion sensor, a second motion sensor and an output device, the method comprising: receiving at the processor, from the first motion sensor, first motion data representing movement of an external object relative to the portable electronic device; receiving at the processor, from the second motion sensor, second motion data representing movement of the portable electronic device; generating, at the processor, third motion data based on the first and second motion data, the third motion data representing movement of the external object; and, controlling the output device based on the third motion data. A computer readable storage medium for storing computer readable instructions for execution by a processor, the computer readable instructions implementing the method can also be provided.

Another aspect of the specification provides a portable electronic device comprising: an output device; a first motion sensor for generating first motion data representing movement of an external object relative to the portable electronic device; a second motion sensor for generating second motion data representing movement of the portable electronic device; a memory for maintaining first and second motion data; and a processor interconnected with the first motion sensor, the second motion sensor and the memory, the processor configured to receive the first motion data and the second motion data; the processor further configured to generate third motion data based on the first and second motion data, the third motion data representing movement of the external object; the processor further configured to control the output device based on the third motion data.

Figure 1:
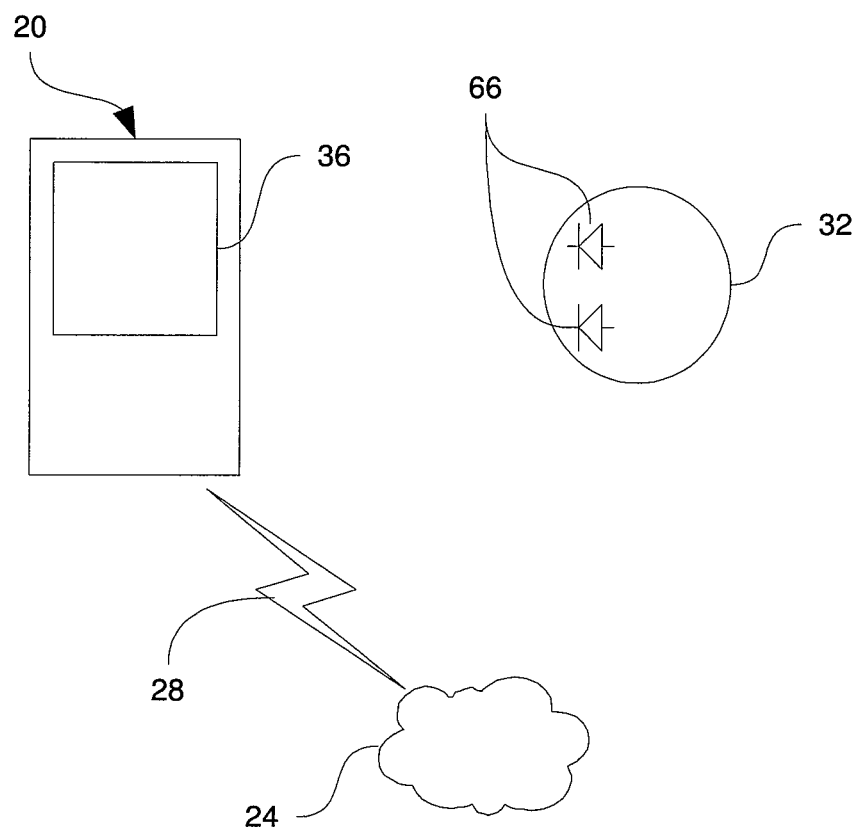
FIG. 1 depicts a schematic diagram of a portable electronic device and an external object, according to a non-limiting embodiment.

Referring now to FIG. 1, a portable electronic device 20 is depicted. In the present embodiment, portable electronic device 20 is based on the computing environment and functionality of a hand-held wireless communication device. It will be understood, however, that portable electronic device 20 is not limited to a hand-held wireless communication device. Other portable electronic devices are possible, such as a personal digital assistants ("PDA"), a cellular telephone, a smart telephone, a laptop computer, a multimedia player and the like. In general, portable electronic device 20 can be configured to communicate with a network 24 via a link 28. Link 28 between portable electronic device 20 and network 24 can, in a present embodiment, be based on core mobile network infrastructure (e.g. Global System for Mobile communications ("GSM"); Code Division Multiple Access ("CDMA"); CDMA 2000; 3G; 4G). Link 28 can also be based on wireless local area network ("WLAN") infrastructures such as the Institute for Electrical and Electronic Engineers ("IEEE") 802.11 Standard (and its variants), Bluetooth and the like, or hybrids thereof. Note that in an exemplary variation of portable electronic device 20, link 28 can also be a wired connection to network 24. In further exemplary variations, link 28 can be a composite link comprising both wireless and wired links as described above.

Also depicted in FIG. 1 is an external object 32. It will now be apparent that external object 32 is "external" to portable electronic device 20 in that it is moveable in three-dimensional space independently from portable electronic device 20. External object 32 can be, in a present embodiment, the head of a user of portable electronic device 20, although it will be appreciated that a wide variety of other external objects will also occur to those skilled in the art.

Portable electronic device 20 includes, among other components, output devices such as a display device 36. In general, portable electronic device 20 is configured to control at least one output device (such as display device 36) according to the movement of external object 32, as will be described in greater detail below.

Figure 2:
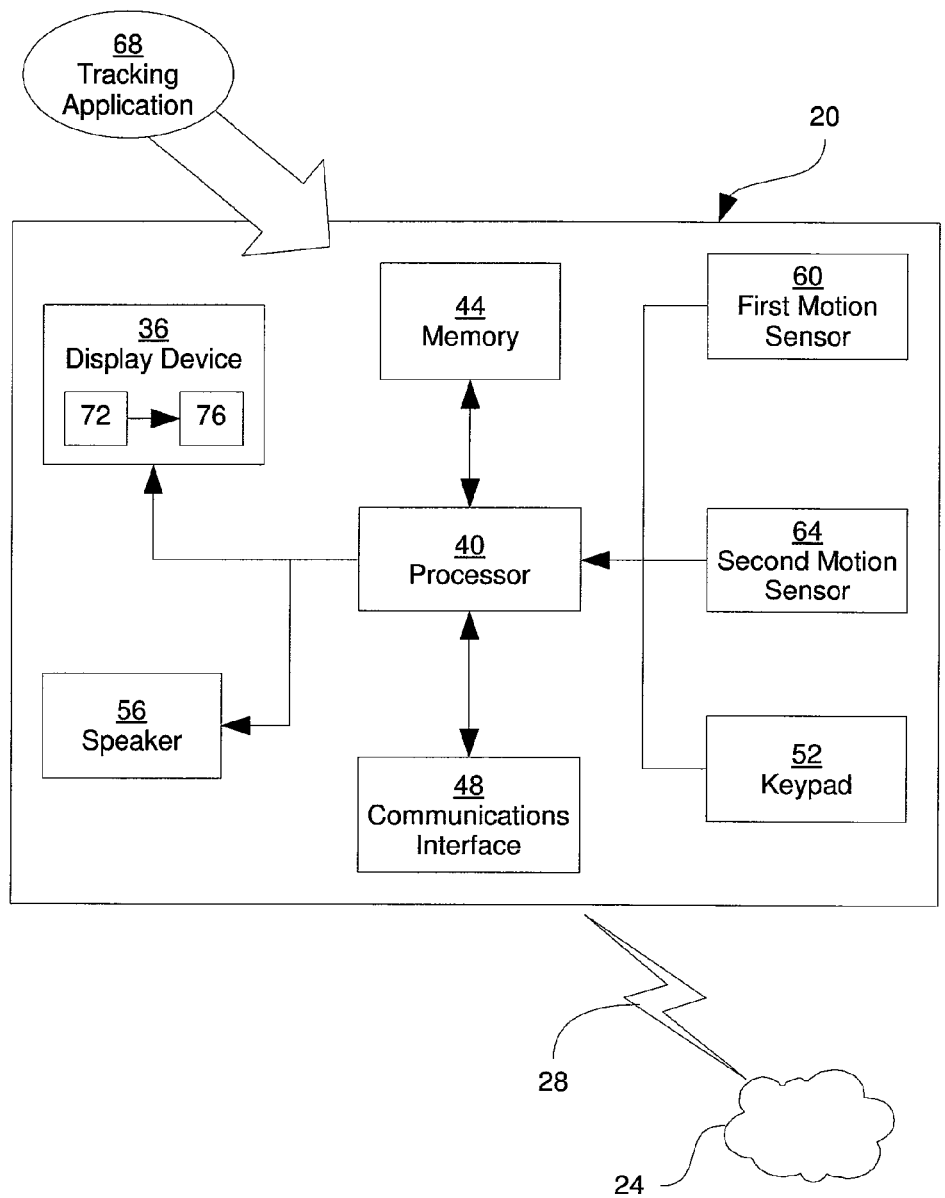
FIG. 2 depicts a schematic block diagram of various components of the portable electronic device of FIG. 1, according to a non-limiting embodiment.

Referring now to FIG. 2, a schematic block diagram shows portable electronic device 20 in greater detail. It will be understood that the structure in FIG. 2 is purely exemplary, and contemplates a device that may be used for both wireless voice (e.g. telephony) and wireless data (e.g. email, web browsing, text) communications. Portable electronic device 20 is based on a microcomputer that includes a processor 40. Portable electronic device 20 also includes a memory 44, which can comprise volatile memory such as Random Access Memory ('RAM'). Memory 44 can also comprise non-volatile memory such as Read Only Memory ('ROM'), Electrically Erasable Programmable Read Only Memory ('EEPROM') flash memory and the like. It will be appreciated that memory 44 can also comprise a suitable combination of volatile and non-volatile memory.

Portable electronic device 20 also includes a communications interface 48 for communicating with network 24 via link 28, as described earlier. Portable electronic device 20 also includes, for example, a keypad 52 for receiving input data (in the form of key selections, for example). It will now be apparent that portable electronic device 20 can further include additional input devices (not shown), such as one or more microphones, a touch screen integrated with at least a portion of display device 36, a trackball and the like. Portable electronic device 20 also includes a variety of output devices. Among the output devices of portable electronic device 20 are display device 36 and a speaker 56. It will now be apparent that speaker 56 can also be an array of two or more speakers. Other output devices are also contemplated, such as a motor (not shown) for vibrational output. The various components of portable electronic device 20 are interconnected with processor 40 via a communications bus (not shown).

As seen in FIG. 2, among the input devices of portable electronic device 20 are a first motion sensor 60 and a second motion sensor 64. First motion sensor 60 generates first motion data representing movement of external object 32 relative to portable electronic device 20. It will now be apparent that the first motion data can be generated in a variety of ways. Referring briefly to FIG. 1, in the present non-limiting embodiment, external object 32 is equipped with at least two light sources such as light-emitting diodes ("LEDs") 66. Other light sources are also contemplated, such as incandescent light sources or organic light-emitting diodes ("OLEDs"). In some embodiments, at least one of the LEDs 66 can be coupled to an earpiece (not shown) associated with portable electronic device 20. In the present embodiment, LEDs 66 can be infrared LEDs, though various alternatives—including visible light as well as other regions of the electromagnetic spectrum—will occur to those skilled in the art.

Returning to FIG. 2, first motion sensor 60 can generate first motion data by receiving light from LEDs 66. It will now be apparent that first motion sensor 60 can be, for example, a digital camera. It is noted that the term "generation" as used herein is also intended to describe embodiments in which first motion sensor 60 assists in the generation of motion data but is not solely responsible for such generation. For example, first motion sensor 60 can capture one or more images for processing by processor 40. Processor 40 can then determine, based on representations of LEDs 66 within the captured images, the changes in position (i.e. movement) of external object 32 relative to portable electronic device 20.

Second motion sensor 64 generates second motion data representing movement of portable electronic device 20 in three-dimensional space. In the present non-limiting embodiment, second motion sensor 64 can be a 3-axis accelerometer in portable electronic device 20. As discussed above with respect to first motion sensor 60, it will be appreciated that "generation" of second motion data by second motion sensor 64 can also involve processor 40, in conjunction with other components of portable electronic device 20.

It will be appreciated that first and second motion sensors 60 and 64 are not limited to the types of motion sensors described above. In other embodiments, first motion sensor 60 can be any suitable motion sensor capable of generating motion data representing the movement of external object 32 relative to portable electronic device 20. Second motion sensor 64 can be any suitable motion sensor capable of generating motion data representing the movement of portable electronic device 20. For example, first and second motion sensors 60 and 64 can include any suitable combination of accelerometers, GPS, light-sensitive components and the like. It will be appreciated that in embodiments (not shown) where first motion sensor 60 includes one or more accelerometers, the one or more accelerometers can be affixed to external object 32, and can transmit acceleration data to first motion sensor 60. For instance, first motion sensor 60 can be integrated with communications interface 48, or can be a separate communications interface configured for receiving acceleration data from the one or more accelerometers.

Portable electronic device 20 also includes a tracking application 68. Tracking application 68 comprises programming instructions for execution by processor 40. In a present embodiment, tracking application 68 can be maintained in memory 44 of portable electronic device. However, it will be understood that in other embodiments, tracking application 68 can be maintained in any of a variety of computer readable storage media, including but not limited to removable diskettes, optical media such as compact discs ("CDs") and digital video discs ("DVDs"), hard drive disks, USB drives and the like.

Processor 40 can execute the programming instructions of tracking application 68, making appropriate use of memory 44 as necessary. Tracking application 68, when executed by processor 40, configures processor 40 to control at least one output device of portable electronic device 20 based on the movement of external object 32. More particularly, tracking application 68 configures processor 40 to generate third motion data based on the first and second motion data described above. The third motion data represents the movement of external object 32. Processor 40 is then configured, via execution of tracking application 68, to control at least one output device based on the third motion data.

Figure 3:
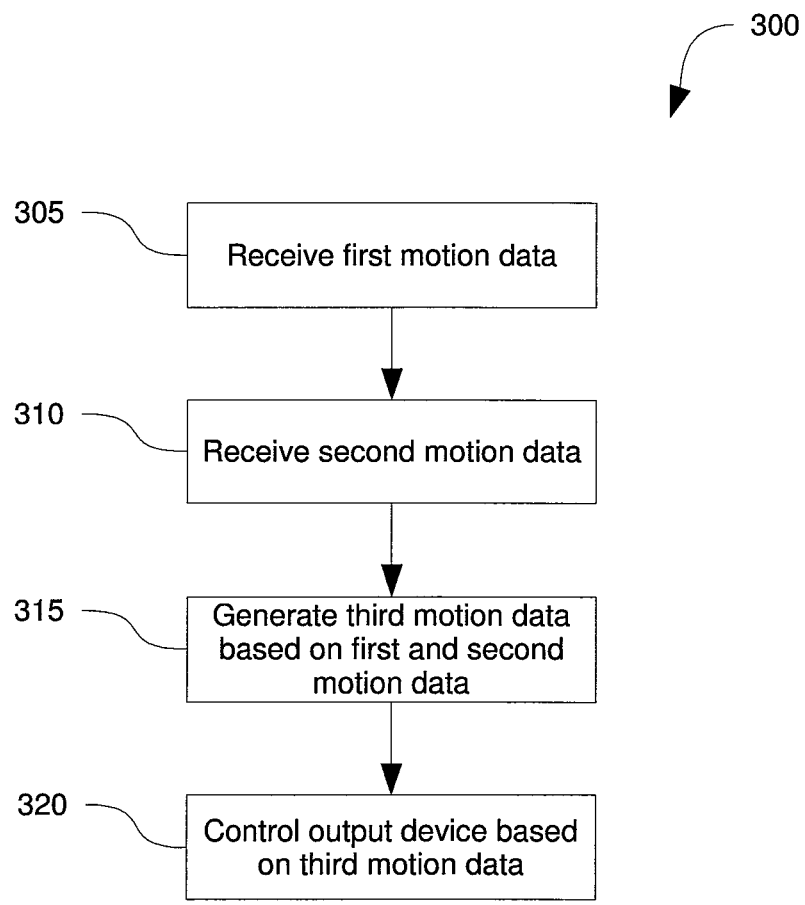
FIG. 3 depicts a method of controlling an output device of the portable electronic device of FIG. 1, according to a non-limiting embodiment.

Referring now to FIG. 3, a flowchart is shown depicting a method, indicated generally at 300, of controlling an output device of portable electronic device 20. It will be understood that method 300 can be carried out by processor 40 while executing tracking application 68.

Method 300 begins at block 305 with the receipt of first motion data at processor 40. First motion data, as described above, represents the movement of external object 32 relative to portable electronic device 20. As will be appreciated by those skilled in the art, the first motion data can include an indication of the current position of external object 32, and/or can include indications of changes in the position of external object 32 over a predetermined period of time. In other embodiments, other types of motion data will occur to those skilled in the art (e.g. velocity, acceleration data and so on). It will be appreciated that as processor 40 can be involved in the generation of first motion data, the first motion data is "received" by processor 40 at block 305 in that sufficient information is received from first motion sensor 60 for processor 40 to complete the generation of first motion data. Received first motion data can be stored in memory 44.

Next, at block 310, second motion data is received at processor 40. Second motion data represents the movement of portable electronic device 20 (typically with respect to the Earth), and can therefore include any of velocity, acceleration and direction information (or a combination thereof) for portable electronic device 20 over a predetermined period of time. As above, it will be appreciated that block 310 can involve the receipt of sufficient information from second motion sensor 64 to complete the generation of second motion data. Received second motion data can be stored in memory 44. It will now be apparent that blocks 305 and 310 of method 300 can be carried out substantially simultaneously, thus allowing first and second motion data received at processor 40 to relate to substantially the same period of time.

Following the receipt of first and second motion data at blocks 305 and 310, method 300 proceeds to block 315. At block 315, processor 40 is configured by tracking application 68 to generate third motion data based on the received first and second motion data. Third motion data generated at processor 40 represents the movement of external object 32, substantially independent of the movement of portable electronic device 20. Third motion data may be thought of conventionally as movement of external object 32 with respect to the portable electronic device 20, as though the portable electronic device 20 were stationary.

Figure 4:
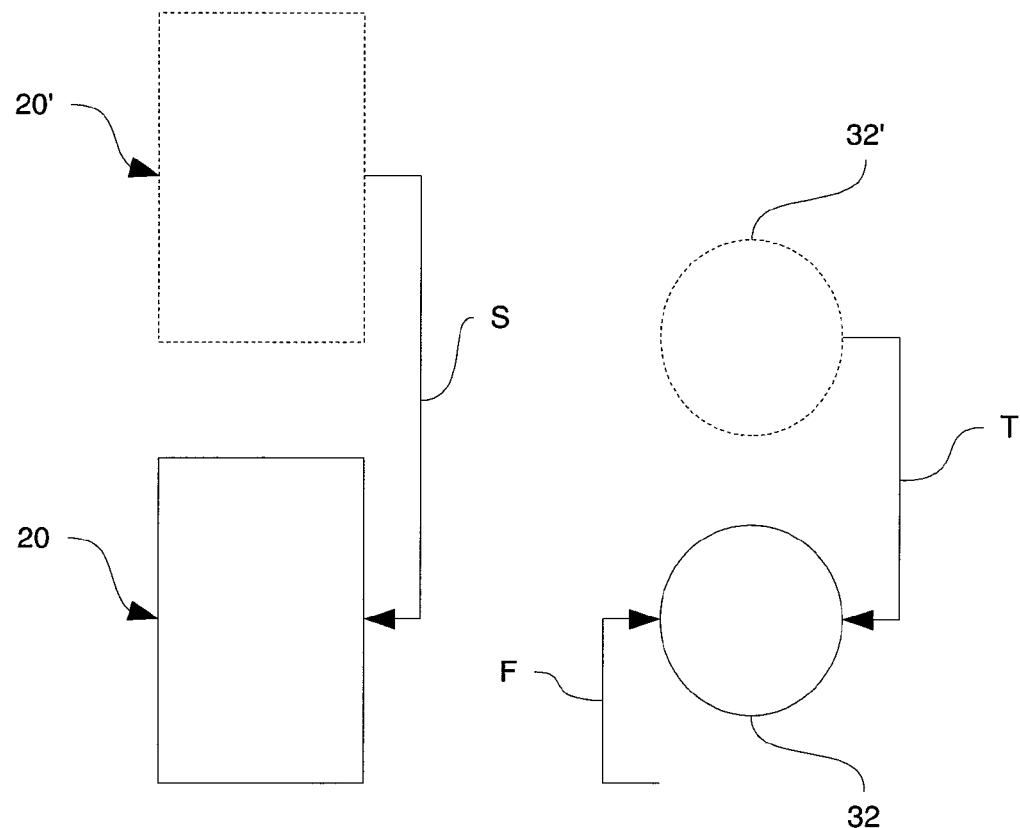
FIG. 4 depicts a schematic diagram showing movement of the portable electronic device and external object of FIG. 1, according to a non-limiting embodiment.

Referring briefly to FIG. 4, portable electronic device 20 and external object 32 are shown. In particular, the movement of portable electronic device 20 and external object 32 over substantially the same period of time is shown. Reference characters 20' and 32' indicate the previous positions (shown in dashed lines) of portable electronic device 20 and external object 32, respectively. The present positions of portable electronic device 20 and external object 32 are shown in solid lines. As can be seen from the Figure, both portable electronic device 20 and external object 32 have moved in the same direction (i.e. "downwards" on the page). However, portable electronic device 20 has traversed a greater distance than external object 32. Thus, first motion data, indicated at "F," shows that the movement of external object 32 relative to portable electronic device 20 was "upwards" on the page. Second motion data "S" shows the movement of portable electronic device 20. Third motion data "T" shows the "actual" movement of external object 32, independent of the movement of portable electronic device 20.

Returning to FIG. 3, therefore, at block 315 processor 40 can generate third motion data, for example, by subtracting one of first and second motion data from the other of first and second motion data. Subtracting may include not only finding the difference of scalar quantities but also subtraction of vector quantities, such as if the first and second motion data comprise magnitude and directional information. The performance of block 315 can also include the performance of various types of filtering, noise and/or jitter removal, and the like, as will occur to those skilled in the art. For example, data indicating movement in certain directions or at certain frequencies can be removed, attenuated or emphasized by processor 40 during generation of third motion data.

Proceeding to block 320 following completion of block 315, processor 40 can then control at least one output device of portable electronic device 20 based on the third motion data generated at block 315.

In a present exemplary embodiment, at block 320 processor 40 can be configured by tracking application 68 to control display device 76 based on third motion data. Returning to FIG. 2, display device 36 can include circuitry 72 for producing representations (generally indicated at 76) for display by display device 36. Representations 76 can be based on representation data generated by processor 40 and stored in memory 44. It will be understood that display device 36 can comprise any suitable combination of flat panel (for example, LCD, plasma and the like) and/or CRT displays. Circuitry 72 can include any suitable combination of circuitry for controlling the flat panel and/or CRT displays. For example, circuitry 72 can include display buffers, transistors, electron beam controllers, LCD cells, plasma cells, phosphors and the like. In general, display device 36 can be controlled by processor 40 to display representations 76.

Figure 5A:
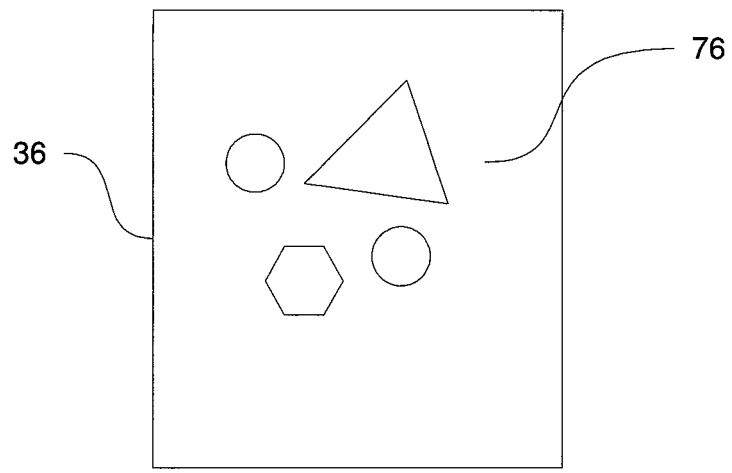
FIG. 5a depicts a representation displayed by a display device of the portable electronic device of FIG. 1, according to a non-limiting embodiment.

An exemplary representation 76 is shown in FIG. 5a. Representation 76 is representative of a portion of an image maintained, for example, in memory 44 of portable electronic device 20.

Figure 5B:
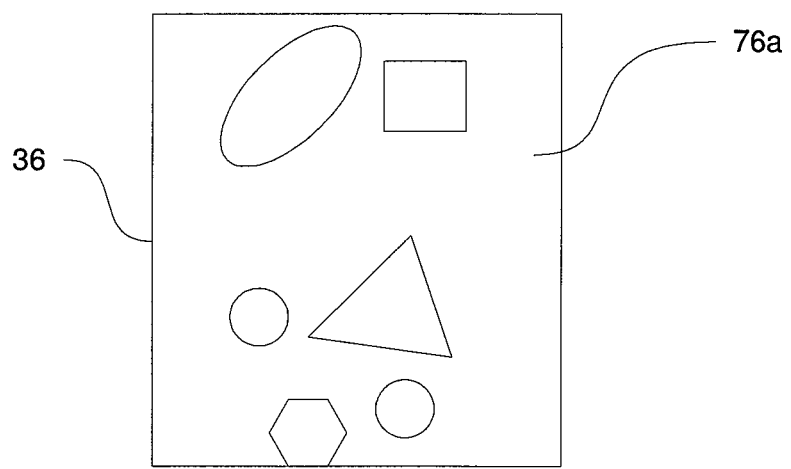
FIG. 5b depicts a further representation displayed by a display device of the portable electronic device of FIG. 1, according to a non-limiting embodiment.

At block 320, processor 40 can control display device 36 in a wide variety of ways based on third motion data. For example, tracking application 68 can configure processor 40 to control display device 36 to behave as a window or picture frame. Referring now to FIG. 5b, an updated representation 76a is displayed by display device 36. In representation 76a, the portion of the image shown in FIG. 5a is located closer to the bottom of display device 36, while a previously-unseen portion of the image has become visible towards the top of display device 36. In a present exemplary embodiment, processor 40 can cause display device 36 to display such an updated representation in response to movement of external object 32 as shown in FIG. 4. In FIG. 4, external object 32 was shown moving downwards on the page. Thus, the representation 76a of FIG. 5b represents the image having also moved downwards, as if viewed from the location of external object 32 through a window frame.

It will be appreciated that the above-described control of display device 36 based on third motion data can be implemented, for example, to compensate for rapid, jerky movements of external object 32. Such movements can, in some embodiments, be substantially mirrored by successively updated representations 76 such that representations 76 appear to be substantially stationary from the point of view of external object 32.

It will now be apparent that display device 36 can be controlled in a variety of ways by processor 40 while executing tracking application 68. For example, in some embodiments processor 40 can cause display device 36 to display zoom in or out. In such embodiments, third motion data indicating movement of external object 32 in a certain direction can cause display 36 to display an updated representation showing only a portion of a previous representation, but at greater magnification, as discussed below with reference to FIGS. 6a and 6b.

Figure 6A:
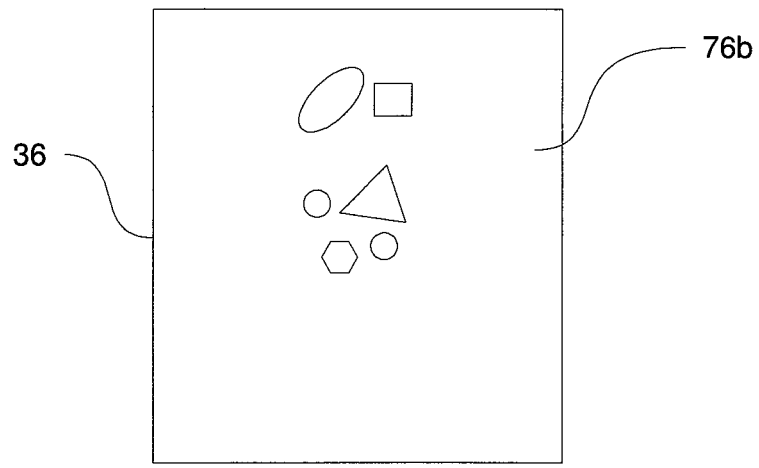
FIG. 6a depicts another representation displayed by a display device of the portable electronic device of FIG. 1, according to another non-limiting embodiment.
Figure 6B:
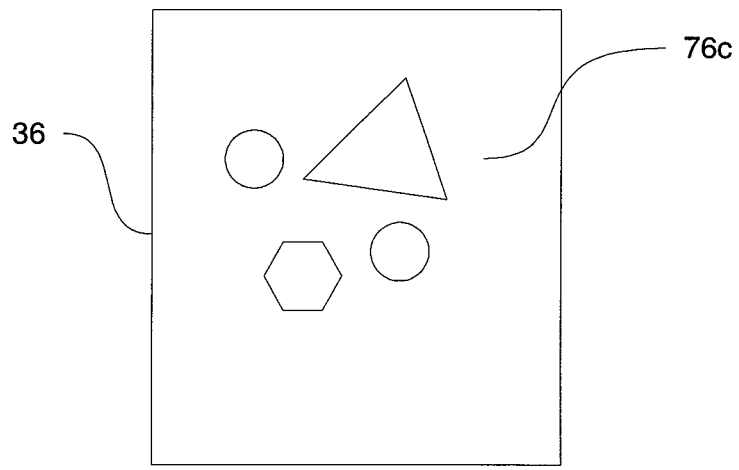
FIG. 6b depicts yet another representation displayed by a display device of the portable electronic device of FIG. 1, according to another non-limiting embodiment; and, FIG. 7 depicts a method of controlling an output device of the portable electronic device of FIG. 1, according to a further non-limiting embodiment.

FIG. 6a shows a further representation 76b generated by display device 36, while FIG. 6b shows yet another representation, 76c. It will now be apparent that in representation 76b, the image from FIGS. 5a and 5b is displayed at a reduced zoom level (that is, the image is smaller and thus a greater portion of the image is visible) while in representation 76c the image is displayed at an increased zoom level. Such control over display device 36 can be exerted by processor 40 in response to third motion data indicating that external object 32, as shown in FIG. 4, has moved rightwards on the page, taking it further from portable electronic device 20. Display device 36 is thus controlled to behave as a window or picture frame, through which a lesser portion of a scene would be visible as the viewer moved away from the window or picture frame.

It will also now be apparent that other output devices, or any combination of output devices, can be controlled by processor 40 executing tracking application 68. In some embodiments, speaker 56 can be controlled by processor 40 based on third motion data. For example, similarly to the zoom feature described above, the volume of speaker 56 can be adjusted upwards or downwards if third motion data indicates movement of external object 32 in a certain direction. As a further example, speaker 56, in some embodiments (not shown) can have directional capabilities. For instance, speaker 56 can be an array of speakers or a movable speaker. The output of such directional output devices can be controlled based on third motion data, for example to project audio output towards external object 32.

Figure 7:
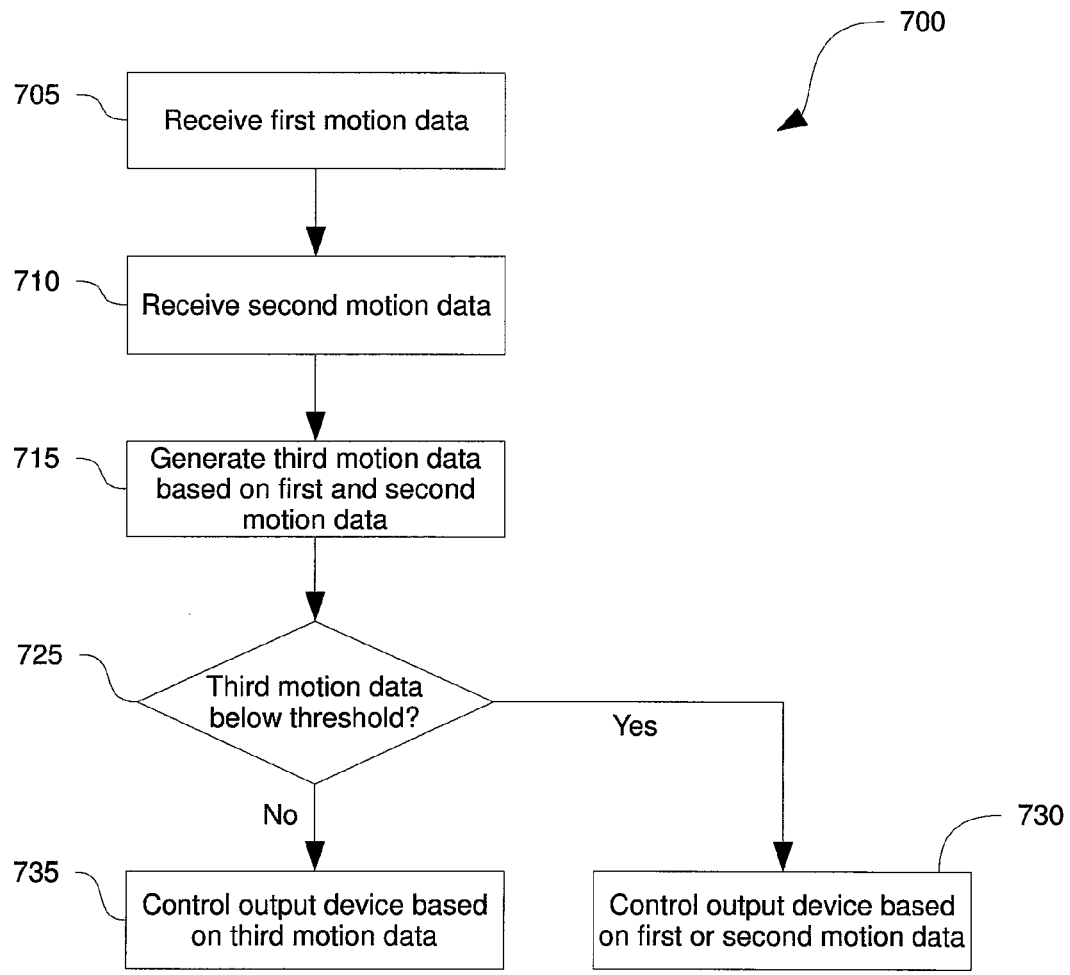

Referring now to FIG. 7, a flowchart is shown depicting a method, indicated generally at 700, of controlling an output device of portable electronic device 20 according to another non-limiting embodiment.

Blocks 705 to 715 of method 700 are similar to blocks 305 to 315, respectively, of method 300 as discussed above. At block 725, however, performance of method 700 differs from performance of method 300 in that a determination is made as to whether third motion data is below a predetermined threshold. It will be understood that such a threshold can be based on a certain velocity, acceleration, distance traveled in a given time period, or a combination thereof. Various thresholds will occur to those skilled in the art. If at block 725 processor 40 determines that third motion data does fall below the threshold (i.e. that external object 32 is moving "too little"), method 700 proceeds to block 730, at which processor 40 controls an output device based on at least one of the first and second motion data. In other words, if little or no movement of external object 32 is detected, the output devices of portable electronic device 20 can be controlled by processor 40 executing tracking application 68 based on the movement of portable electronic device 20 itself.

The output devices of portable electronic device 20 can be controlled at step 730 in manners similar to those described above (e.g. "window" functionality, zooming, volume adjustment). Controlling an output device may also include controlling an output device other than a display. For example, controlling an output device may comprise adjusting an image to reduce blur when the image is sent to a printer for printing. Additional examples of output device control will occur to those skilled in the art.

If, on the other hand, it is determined that third motion data does not fall below the predetermined threshold at block 725, method 700 proceeds to block 735, at which processor 40 can be configured to control the output devices of portable electronic device 20 as described above in relation to block 320 of method 300.

From the above description of the present embodiment, certain advantages will now be apparent. In particular, processor 40 of portable electronic device 20 as described above can be configured to distinguish between the movement of portable electronic device 20 and external object 32, thus allowing for a broader range of control options for the output devices of portable electronic device 20. Other advantages will also occur to those skilled in the art.

Those skilled in the art will appreciate that in some embodiments, the functionality of tracking application 68 can be implemented using pre-programmed hardware or firmware elements (e.g., application specific integrated circuits (ASICs), electrically erasable programmable read-only memories (EEPROMs), etc.), or other related components. In other embodiments, the functionality of portable electronic device 20 can be achieved using a computing apparatus (not shown) that has access to a code memory (not shown) which stores computer-readable programming instructions for operation of the computing apparatus. The computer-readable programming instructions can be stored on a medium which is fixed, tangible and readable directly by the components of the computing apparatus, (e.g., removable diskette, CD-ROM, ROM, fixed disk, USB drive). Alternatively, the computer-readable programming instructions can be stored remotely but transmittable to these components via a modem or other communications interface connected to a network (including, without limitation, the Internet) over a transmission medium. The transmission medium can be either a non-wireless medium (e.g., optical or analog communications lines) or a wireless medium (e.g., microwave, infrared, free-space optical or other transmission schemes) or a combination thereof.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

I claim:

1. A method of controlling a display of a portable electronic device comprising a processor, a first motion sensor, a second motion sensor and the display, the method comprising:
   controlling the display to generate a representation;
   receiving at the processor, from the first motion sensor, first motion data representing movement of an external object relative to the portable electronic device;
   in response to movement of the portable electronic device including a jitter component, receiving at the processor, from the second motion sensor, second motion data representing the movement of the portable electronic device independent of the external object;
   generating, at the processor, third motion data by removing the jitter component from the second motion data to produce jitter-free second motion data, and determining a difference between the first motion data and the jitter-free second motion data, the third motion data representing movement of the external object independent of movement of the portable electronic device; and,
   controlling the display to update the representation based on the third motion data, such that the updated representation generated by the display reflects the movement of the external object independent of the portable electronic device.

2. The method of claim 1, wherein generating the third motion data comprises subtracting one of the first motion data and the jitter-free second motion data from the other of the first motion data and the jitter-free second motion data.

3. The method of claim 1, wherein the portable electronic device further comprises a speaker, and wherein the method further comprises controlling the speaker by varying a volume of the speaker based on the third motion data.

4. The method of claim 1, wherein controlling comprises:
   determining if the third motion data is representative of movement below a predetermined threshold; and
   when the determination is affirmative, controlling the output device based on one of the first and second motion data, and when the determination is negative, controlling the output device based on the third motion data.

5. The method of claim 1, wherein generating third motion data comprises performing at least one of filtering and noise removal.

6. A portable electronic device comprising:
   a display;
   a first motion sensor for generating first motion data representing movement of an external object relative to the portable electronic device;
   a second motion sensor for generating second motion data representing movement of the portable electronic device independent of the external object, the movement of the portable electronic device including a jitter component;

a memory for maintaining first and second motion data; and a processor interconnected with the first motion sensor, the second motion sensor and the memory, the processor configured to control the display to generate a representation, and to receive the first motion data;

the processor further configured, in response to the movement of the portable electronic device, to receive the second motion data;

the processor further configured to generate third motion data by removing the jitter component from the second motion data to produce jitter-free second motion data, and determining a difference between the first motion data and the jitter-free second motion data, the third motion data representing movement of the external object independent of movement of the portable electronic device;

the processor further configured to control the display to update the representation based on the third motion data, such that the updated representation generated by the display reflects the movement of the external object independent of the portable electronic device.

7. The portable electronic device of claim 6, the processor further configured to generate the third motion data by subtracting one of the first motion data and the jitter-free second motion data from the other of the first motion data and the jitter-free second motion data.

8. The portable electronic device of claim 6, further comprising a speaker; the processor further configured to control the speaker to vary a volume of the speaker based on the third motion data.

9. The portable electronic device of claim 6, the processor further being configured to determine if the third motion data is representative of movement below a predetermined threshold; and when the determination is affirmative, to control the output device based on one of the first and second motion data; and when the determination is negative, to control the output device based on the third motion data.

10. The portable electronic device of claim 6, the processor further configured to perform at least one of filtering and noise removal during generation of the third motion data.

11. The portable electronic device of claim 6, wherein the first motion sensor comprises a digital camera for receiving light from at least one light emitting diode affixed to the external object.

12. The portable electronic device of claim 6, wherein the second motion sensor comprises an accelerometer.

13. A non-transitory computer readable storage medium for storing computer readable instructions for execution by a processor of a portable electronic device having a first motion sensor, a second motion sensor and a display, the computer readable instructions implementing the steps of:

controlling the display to generate a representation;

receiving at the processor, from the first motion sensor, first motion data representing movement of an external object relative to the portable electronic device;

in response to movement of the portable electronic device including a jitter component, receiving at the processor, from the second motion sensor, second motion data representing the movement of the portable electronic device independent of the external object;

generating, at the processor, third motion data by removing the jitter component from the second motion data to produce jitter-free second motion data, and determining a difference between the first and second motion data, the third motion data representing movement of the external object independent of movement of the portable electronic device; and, controlling the display to update the representation based on the third motion data, such that the updated representation generated by the display reflects the movement of the external object independent of the portable electronic device.

* * * * *